US010009137B2

(12) United States Patent
Yoshida et al.

(10) Patent No.: US 10,009,137 B2
(45) Date of Patent: Jun. 26, 2018

(54) OPTICAL COMMUNICATION SYSTEM, STATION-SIDE DEVICE, SUBSCRIBER DEVICE, AND OPTICAL COMMUNICATION METHOD

(71) Applicant: NIPPON TELEGRAPH AND TELEPHONE CORPORATION, Tokyo (JP)

(72) Inventors: Tomoaki Yoshida, Yokosuka (JP); Shin Kaneko, Yokosuka (JP); Shunji Kimura, Atsugi (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days. days.

(21) Appl. No.: 15/325,961

(22) PCT Filed: Jul. 23, 2015

(86) PCT No.: PCT/JP2015/070974
§ 371 (c)(1),
(2) Date: Jan. 12, 2017

(87) PCT Pub. No.: WO2016/013616
PCT Pub. Date: Jan. 28, 2016

(65) Prior Publication Data
US 2017/0207875 A1 Jul. 20, 2017

(30) Foreign Application Priority Data
Jul. 24, 2014 (JP) ................. 2014-150477

(51) Int. Cl.
*H04J 14/02* (2006.01)
*H04B 10/079* (2013.01)
*H04Q 11/00* (2006.01)

(52) U.S. Cl.
CPC ...... *H04J 14/025* (2013.01); *H04B 10/07957* (2013.01); *H04Q 11/0067* (2013.01);
(Continued)

(58) Field of Classification Search
CPC ............ H04B 10/032; H04B 10/07957; H04J 14/025
See application file for complete search history.

(56) References Cited

U.S. PATENT DOCUMENTS

| 2006/0062576 A1* | 3/2006 | Nakamura | .......... H04J 14/0226 398/72 |
| 2006/0210266 A1* | 9/2006 | Aoki | .................. H04Q 11/0005 398/19 |

(Continued)

FOREIGN PATENT DOCUMENTS

| JP | 2008-054278 A | 3/2008 |
| JP | 2010-034877 A | 2/2010 |

(Continued)

OTHER PUBLICATIONS

Kazutaka Hara et al., Flexible load balancing technique using dynamic wavelength bandwidth allocation (DWBA) toward 100Gbit/s-class-WDM/TDM-PON, Tu.3.B.2,ECOC2010, 2010.

(Continued)

*Primary Examiner* — Dzung Tran
(74) *Attorney, Agent, or Firm* — Harness, Dickey & Pierce, P.L.C.

(57) ABSTRACT

An optical communication system of the present invention switches a communication wavelength from a current communication wavelength to a auxiliary communication wavelength when an abnormality occurs in a communication wavelength between a station-side device and any one of a plurality of subscriber devices. Further, this optical communication system switches a communication wavelength used for communication between the subscriber device and the (Continued)

station-side device that perform communication using the auxiliary communication wavelength from the auxiliary communication wavelength back to the current communication wavelength when communication is recovered from an abnormality in the current communication wavelength.

5 Claims, 8 Drawing Sheets

(52) U.S. Cl.
CPC ............... *H04Q 2011/0083* (2013.01); *H04Q 2011/0086* (2013.01)

(56) References Cited

U.S. PATENT DOCUMENTS

| 2008/0025724 | A1 | 1/2008 | Ozaki |
| 2008/0267628 | A1 | 10/2008 | Li et al. |
| 2011/0085795 | A1 | 4/2011 | Ozaki |
| 2014/0133863 | A1* | 5/2014 | Mizutani ............. H04J 14/0257 398/79 |
| 2016/0269105 | A1 | 9/2016 | Yoshida et al. |
| 2017/0171647 | A1* | 6/2017 | Gao .................... H04Q 11/0005 |

FOREIGN PATENT DOCUMENTS

| JP | 2011-082908 A | 4/2011 |
| WO | WO-2004/107626 A1 | 12/2004 |
| WO | WO-2015/060277 A1 | 4/2015 |

OTHER PUBLICATIONS

S. Kimura, WDM/TDM-PON Technologies for Future Flexible Optical Access Networks, 6A1-1, OECC2010, 2010.

S.Tamaki et al., λ-Tunable WDM/TDM-PON System for Future Optical Access Network, The Institute of Electronics Information and Communication Engineers, IEICE Technical Report, vol. 112, No. 118, 2012 with partial translation.

International Search Report for PCT/JP2015/070974, ISA/JP, Tokyo, dated Aug. 25, 2015.

* cited by examiner

FIG. 4

OLT

| | CURRENT COMMUNICATION WAVELENGTH | AUXILIARY COMMUNICATION WAVELENGTH | OPERATION STATE |
|---|---|---|---|
| ONU#1 | $\lambda_{1u,d}$ | $\lambda_{2u,d}$ | CURRENT COMMUNICATION WAVELENGTH |
| ONU#2 | $\lambda_{mu,d}$ | $\lambda_{3u,d}$ | CURRENT COMMUNICATION WAVELENGTH |
| ... | ... | ... | |
| ONU#h | $\lambda_{mu,d}$ | $\lambda_{1u,d}$ | CURRENT COMMUNICATION WAVELENGTH |

FIG. 5

ONU#1

| CURRENT COMMUNICATION WAVELENGTH | AUXILIARY COMMUNICATION WAVELENGTH |
|---|---|
| $\lambda_{1u,d}$ | $\lambda_{2u,d}$ |

ONU#2

| CURRENT COMMUNICATION WAVELENGTH | AUXILIARY COMMUNICATION WAVELENGTH |
|---|---|
| $\lambda_{mu,d}$ | $\lambda_{3u,d}$ |

⋮

ONU#h

| CURRENT COMMUNICATION WAVELENGTH | AUXILIARY COMMUNICATION WAVELENGTH |
|---|---|
| $\lambda_{mu,d}$ | $\lambda_{1u,d}$ |

FIG. 6

OLT

| | CURRENT COMMUNICATION WAVELENGTH | AUXILIARY COMMUNICATION WAVELENGTH | OPERATION STATE |
|---|---|---|---|
| ONU#1 | $\lambda_{1u,d}$ | $\lambda_{2u,d}$ | CURRENT COMMUNICATION WAVELENGTH |
| ONU#2 | $\lambda_{mu,d}$ | $\lambda_{3u,d}$ | AUXILIARY COMMUNICATION WAVELENGTH |
| ... | ... | ... | |
| ONU#h | $\lambda_{mu,d}$ | $\lambda_{1u,d}$ | AUXILIARY COMMUNICATION WAVELENGTH |

FIG. 7

OLT

| | CURRENT COMMUNICATION WAVELENGTH | AUXILIARY COMMUNICATION WAVELENGTH | OPERATION STATE |
|---|---|---|---|
| ONU#1 | $\lambda_{1u,d}$ | $\lambda_{2u,d}$ | CURRENT COMMUNICATION WAVELENGTH |
| ONU#2 | $\lambda_{3u,d}$ | $\lambda_{mu,d}$ | CURRENT COMMUNICATION WAVELENGTH |
| ... | ... | ... | |
| ONU#h | $\lambda_{1u,d}$ | $\lambda_{mu,d}$ | CURRENT COMMUNICATION WAVELENGTH |

FIG. 8

ONU#1

| CURRENT COMMUNICATION WAVELENGTH | AUXILIARY COMMUNICATION WAVELENGTH |
|---|---|
| $\lambda_{1u,d}$ | $\lambda_{2u,d}$ |

ONU#2

| CURRENT COMMUNICATION WAVELENGTH | AUXILIARY COMMUNICATION WAVELENGTH |
|---|---|
| $\lambda_{3u,d}$ | $\lambda_{mu,d}$ |

⋮

ONU#h

| CURRENT COMMUNICATION WAVELENGTH | AUXILIARY COMMUNICATION WAVELENGTH |
|---|---|
| $\lambda_{1u,d}$ | $\lambda_{mu,d}$ |

FIG. 10

ONU#1

| CURRENT COMMUNICATION WAVELENGTH | AUXILIARY COMMUNICATION WAVELENGTH |
|---|---|
| $\lambda_{1u,d}$ | $\lambda_{2u,d}$ |

ONU#2

| CURRENT COMMUNICATION WAVELENGTH | AUXILIARY COMMUNICATION WAVELENGTH |
|---|---|
| $\lambda_{mu,d}$ | $\lambda_{3u,d}$ |

⋮

ONU#h

| CURRENT COMMUNICATION WAVELENGTH | AUXILIARY COMMUNICATION WAVELENGTH |
|---|---|
| $\lambda_{mu,d}$ | $\lambda_{1u,d}$ |

FIG. 11

ONU#1

| CURRENT COMMUNICATION WAVELENGTH | AUXILIARY COMMUNICATION WAVELENGTH |
|---|---|
| $\lambda_{1u,d}$ | $\lambda_{2u,d}$ |

ONU#2

| CURRENT COMMUNICATION WAVELENGTH | AUXILIARY COMMUNICATION WAVELENGTH |
|---|---|
| $\lambda_{3u,d}$ | $\lambda_{mu,d}$ |

⋮

ONU#h

| CURRENT COMMUNICATION WAVELENGTH | AUXILIARY COMMUNICATION WAVELENGTH |
|---|---|
| $\lambda_{1u,d}$ | $\lambda_{mu,d}$ |

FIG. 12

OLT

|  | CURRENT COMMUNICATION WAVELENGTH | AUXILIARY COMMUNICATION WAVELENGTH 1 | AUXILIARY COMMUNICATION WAVELENGTH 2 | OPERATION STATE |
|---|---|---|---|---|
| ONU#1 | $\lambda_{1u,d}$ | $\lambda_{2u,d}$ | $\lambda_{3u,d}$ | CURRENT COMMUNICATION WAVELENGTH |
| ONU#2 | $\lambda_{mu,d}$ | $\lambda_{3u,d}$ | $\lambda_{1u,d}$ | AUXILIARY COMMUNICATION WAVELENGTH 1 |
| ... | ... | ... | ... | |
| ONU#h | $\lambda_{mu,d}$ | $\lambda_{1u,d}$ | $\lambda_{2u,d}$ | AUXILIARY COMMUNICATION WAVELENGTH 1 |

FIG. 13

OLT

|  | CURRENT COMMUNICATION WAVELENGTH | AUXILIARY COMMUNICATION WAVELENGTH 1 | AUXILIARY COMMUNICATION WAVELENGTH 2 | OPERATION STATE |
|---|---|---|---|---|
| ONU#1 | $\lambda_{1u,d}$ | $\lambda_{2u,d}$ | $\lambda_{3u,d}$ | CURRENT COMMUNICATION WAVELENGTH |
| ONU#2 | $\lambda_{mu,d}$ | $\lambda_{3u,d}$ | $\lambda_{1u,d}$ | AUXILIARY COMMUNICATION WAVELENGTH 2 |
| ... | ... | ... | ... | |
| ONU#h | $\lambda_{mu,d}$ | $\lambda_{1u,d}$ | $\lambda_{2u,d}$ | AUXILIARY COMMUNICATION WAVELENGTH 1 |

OPTICAL COMMUNICATION SYSTEM, STATION-SIDE DEVICE, SUBSCRIBER DEVICE, AND OPTICAL COMMUNICATION METHOD

CROSS-REFERENCE TO RELATED APPLICATIONS

This application is a 371 U.S. National Stage of International Application No. PCT/JP2015/070974, filed Jul. 23, 2015, which claims the benefit of and priority to Japanese Patent Application No. 2014-150477, filed Jul. 24, 2014. The entire contents of the above applications are incorporated herein by reference.

TECHNICAL FIELD

The present invention relates to an optical communication system, a station-side device, a subscriber device, and an optical communication method.

BACKGROUND ART

With the recent rapid spread of the Internet, a large capacity, advancement, and economization of an access service system have been required, and a passive optical network (PON) has been studied as a means for realizing the large capacity, the advancement, and the economization. The PON is a communication system that achieves economization by sharing one station-side device and a portion of a transmission path among a plurality of subscriber devices using an optical multiplexer/demultiplexer based on an optical passive device.

Currently, an economical optical subscriber system in which a line capacity of 1 Gbps are shared among a maximum of 32 users using time division multiplexing (TDM), and a gigabit Ethernet passive optical network (GE-PON, Ethernet is a registered trademark) have been mainly introduced in Japan. Accordingly, a Fiber To The Home (FTTH) service has been provided at a realistic fee.

Further, in order to meet needs of larger capacity, a 10G-EPON (Ethernet passive optical network) in which a total bandwidth is 10 Gbps has been studied as a next generation optical subscriber system, and international standardization has been completed in 2009. This is an optical subscriber system that realizes a large capacity while using a transmission line portion such as an optical fiber that is the same as that of GE-PON by increasing a bit rate of a transceiver.

In the future, a large capacity exceeding the 10G-class such as high-resolution video services or ubiquitous services may be considered to be required, but there is a problem that practical realization through an simple increase in a bit rate of a transceiver from the 10G-class to the 40/100G-class is difficult due to an increase in system upgrade cost.

As a means for solving this problem, a variable wavelength WDM/TDM-PON in which variable wavelength capability is added to a transceiver, and time division multiplexing (TDM) and wavelength division multiplexing (WDM) are effectively combined so that a transceiver in the station-side device can be additionally installed according to a bandwidth request amount has been reported (for example, see Non-Patent Document 1).

A variable wavelength WDM/TDM-PON has recently attracted attention as a system in which gradual expansion of a total bandwidth or flexible load distribution can be realized according to needs of users, in Non-Patent Document 2. When the total bandwidth is gradually expanded, changing of an optical subscriber unit (OSU) to which an optical network unit (ONU) belongs due to load distribution is realized through wavelength switching in the optical network unit (ONU). FIG. 1 illustrates a variable wavelength WDM/TDM-PON system related to the present invention. The variable wavelength WDM/TDM-PON system related to the present invention includes a station-side subscriber accommodation device (Optical Line Terminal; OLT) 10 and a subscriber device (ONU) 20. The OLT 10 includes a dynamic wavelength bandwidth allocation circuit 101, a demultiplexing unit 106, and an OSU 107. The OLT 10 is connected to the ONU 20 by a PON topology of a point-to-multipoint configuration that uses an optical multiplexer/demultiplexer 11, an optical multiplexer/demultiplexer 12, and optical fibers 13, 14, 15 and 16. The optical multiplexer/demultiplexer 11 and the optical multiplexer/demultiplexer 12 are, for example, a power splitter or a wavelength router. The demultiplexing unit 106 of the OLT 10 is connected to a relay network 40.

The OLT 10 includes line card OSU#1 to OSU#m that transmit and receive a set $\lambda_{1d,u}$ to $\lambda_{md,u}$ of downstream wavelengths $\lambda_{1d}$ to $\lambda_{md}$ and upstream wavelengths $\lambda_{1u}$ to $\lambda_{mu}$, and the dynamic wavelength bandwidth allocation circuit 101. OSU#1 to OSU#m transmit and receive respective wavelength signals of the set $\lambda_{1d,u}$ to $\lambda_{md,u}$ of wavelengths transmitted from the ONU 20. ONU#1 to ONU#h, i.e., h units of ONUs 20, are connected to the OLT 10, and each ONU 20 performs transmission and reception using any one in the set $\lambda_{1d,u}$ to $\lambda_{md,u}$ of downstream and upstream wavelengths. The ONU 20 may perform transmission and reception using any one in the set $\lambda_{1d,u}$ to $\lambda_{md,u}$ of wavelengths according to an instruction from the OLT 10.

An upstream signal from an installed communication device of a user's home is input to each ONU 20 and transmitted as an upstream optical signal in an optical transceiver in the ONU 20. The upstream signal is multiplexed to one optical fiber 13 from a power splitter or a wavelength router on the ONU 20 side toward the OLT 10. Therefore, the OLT 10 calculates and controls a transmission time and a transmission duration of upstream signals transmitted by the respective ONUs 20 so that the upstream signals do not overlap. The upstream signals 1 to m received in OSU#1 to OSU#m are aggregated by the demultiplexing unit 106 in the OLT 10, multiplexed into one upstream signal, and transmitted to the relay network 40. On the other hand, a downstream signal from the relay network 40 to each ONU 20 is separated into downstream signals 1 to m directed to OSU#1 to OSU#m on the basis of destination information of the ONU 20 described in the downstream signal in the demultiplexing unit 106 and information of the OSU 107 to which the ONU 20 belongs. The separated downstream signals 1 to m are sent to the respective ONUs 20 at downstream wavelength $\lambda_{1d}$ to $\lambda_{md}$ respectively set in OSU#1 to OSU#m. The downstream signal is broadcast at a wavelength of each OSU 107, but since a transmission and reception wavelength of the ONU 20 is set to a transmission and reception wavelength of the OSU 107 to which the ONU 20 belongs, the ONU 20 selects information addressed to the ONU 20 from the signal at a reception wavelength, and the information is output from the ONU 20 to the communication device of the user's home.

The dynamic wavelength bandwidth allocation circuit 101 includes a dynamic wavelength and bandwidth assignment (DWBA) calculation unit 103, a switching instruction signal generation unit 102, a control signal transmission unit 104, and a request signal reception unit 105. In the dynamic wavelength bandwidth allocation circuit 101, the request signal reception unit 105 receives a signal including a bandwidth request transmitted from each ONU 20, via each OSU 107, and the DWBA calculation unit 103 calculates the transmission time and the transmission duration of the upstream data signal and the request signal allocated to each ONU 20 on the basis of the request. Then, in the dynamic wavelength bandwidth allocation circuit 101, the switching instruction signal generation unit 102 generates an instruction signal including the calculated transmission time and the calculated transmission duration, and the instruction signal is transmitted from the control signal transmission unit 104 to each ONU 20 via each OSU 107. Further, the DWBA calculation unit 103 manages connection information of the ONU 20 and the OSU 107 in a PON period. When the wavelength is switched, the demultiplexing unit 106 is instructed to change the destination OSU 107 of the downstream signal of the ONU 20 that has changed the wavelength.

FIG. 2 illustrates a configuration of the ONU 20. The ONU 20 includes a data reception unit 201, a data transmission unit 208, an upstream buffer memory 202, a downstream buffer memory 209, a destination analysis and selection reception unit 210, a frame transmission control unit 203, a frame assembly and transmission unit 204, a wavelength-tunable optical transceiver 205, a request bandwidth calculation unit 206, a request signal transmission unit 207, an instruction signal reception unit 211, and a wavelength switching control unit 212.

The upstream signal from the user is received by the data reception unit 201 and temporarily stored in the upstream buffer memory 202. The frame transmission control unit 203 transmits the upstream signal to the frame assembly and transmission unit 204 according to a transmission time and a transmission duration of the upstream signal specified by the instruction signal. The frame assembly and transmission unit 204 constitutes a frame format required to transmit a signal to the OLT 10 in a PON configuration and sends the resultant signal to the wavelength-tunable optical transceiver 205.

The wavelength-tunable optical transceiver 205 converts the optical signal at any one of the wavelengths $\lambda_{1d,u}$ to $\lambda_{md,u}$ designated in the wavelength switching control unit 212, and transmits the optical signal. The downstream signal from the OSU 107 is received by selecting a specified wavelength in the wavelength-tunable optical transceiver 205, and a destination of the downstream signal is analyzed and only the information addressed to the device itself is selected in the destination analysis and selection reception unit 210, and stored in the downstream buffer memory 209. The data transmission unit 208 transmits the information stored in the downstream buffer memory 209 to the user as the downstream signal.

The wavelength-tunable optical transceiver 205 receives an instruction signal from the OLT 10, converts the instruction signal into an electrical signal, and sends the electrical signal to the instruction signal reception unit 211. The instruction signal reception unit 211 analyzes instruction content of the instructing signal, and sends a switching destination wavelength and a switching execution instruction to the wavelength switching control unit 212 at a designated time if a wavelength switching instruction, a wavelength after switching, and a switching start time are included in the instruction signal. The wavelength switching control unit 212 switches the wavelength of the wavelength-tunable optical transceiver 205 according to the wavelength switching control.

Further, the OLT 10 receives information on a bandwidth requested by the ONU 20 from the ONU 20 and uses the information to allocate the bandwidth. There are various methods, such as a method in which an instruction is performed to transmit the information on the requested bandwidth to the OLT 10 using an instruction signal, and the ONU 20 describes the information on the requested bandwidth directed to the OLT 10 in a request signal according to the instruction. In this case, if the instruction signal reception unit 211 receives the instruction signal for requesting request signal transmission, the instruction signal reception unit 211 instructs the request signal transmission unit 207 to generate the request signal. The request signal transmission unit 207 instructs the request bandwidth calculation unit 206 to calculate the requested bandwidth. The request bandwidth calculation unit 206 measures the amount of data of an upstream signal stored in the upstream buffer memory 202, determines a required bandwidth amount on the basis of the data amount, and sends the requested bandwidth amount to the request signal transmission unit 207. The request signal transmission unit 207 generates a request signal in which the requested amount has been described, and sends the request signal to the frame transmission control unit 203.

The instruction signal for the OLT 10 to instruct the ONU 20 to transmit the requested bandwidth may also include information on a transmission start time and a transmission duration of the request signal. In this case, the instruction signal reception unit 211 sends the information on the transmission start time and the transmission duration of the request signal included in the instruction signal to the frame transmission control unit 203, and the time frame transmission control unit 203 sends the request signal to the frame assembly and transmission unit 204 at an instructed time and transmits the request signal to the OLT 10 via the wavelength-tunable optical transceiver 205. Further, the instruction signal transmitted from the OLT 10 includes a transmission start time and a transmission duration at and in which the ONU 20 transmits an upstream signal received from the user, to the OLT 10. The instruction signal reception unit 211 sends information on the transmission start time and the transmission duration of the upstream signal included in the instruction signal to the frame transmission control unit 203, and the frame transmission control unit 203 extracts a frame of the upstream signal from a buffer memory at an instructed time, sends the frame to the frame assembly and transmission unit 204 for the transmission duration, and transmits the frame to the OLT 10 via the wavelength-tunable optical transceiver 205.

Further, Patent Document 1 describes an optical communication system having a function of the ONU 20 selecting an OSU 107 to which the ONU 20 newly belongs and reconnecting to the OSU 107 when an OSU 107 fails as a function of improving reliability and availability of the OLT 10, and an optical communication abnormality recovering method. In Patent Document 1, a wavelength at which a newly reconnected OSU 107 performs transmission and reception can be held as a switching information table in the ONU 20 when an abnormality, such as downstream signal interruption due to failure of the OSU 107 to which the ONU currently belongs, occurs in a reception signal by utilizing wavelength switching that is characteristic of the variable wavelength WDM/TDM-PON, and the communication can be returned earlier by performing the wavelength switching and a connection operation when the ONU 20 detects the abnormality. Further, this switching destination auxiliary communication wavelength is held as a wavelength at which a different OSU 107 performs transmission and reception for each ONU 20. Accordingly, when any OSU 107 fails, the ONUs 20 reconnected to the auxiliary OSU 107 are distributed, and a high-speed reconnection process due to the distribution of a reconnection process of the OSU 107 can be achieved or traffic after reconnection can be distributed to the respective OSUs 107.

However, after the OSU 107 in which the abnormality has occurred is recovered by exchange or the like, a so-called switch-back work of reconnecting the ONU 20 reconnected due to abnormality occurrence to the initially used OSU 107 may be performed for return to a current state. In Patent Document 1, a form in which a auxiliary OSU 107 can be distributed is described, but when return to a current state is performed, it is necessary to trace back a history indicating which ONU 20 has moved to which OSU 107 and send a wavelength switching instruction to the OSU 107 for each recovered ONU 20. This is because when the number of ONUs 20 connected to an initially failed OSU 107 increases, a time or an operation required for a switch-back operation increases and this becomes a burden on a communication network operation. Therefore, in order to reduce an operation burden, it is necessary to have a means for simply performing work of switching the distributed and reconnected ONU 20 back to the recovered OSU 107.

DOCUMENT OF THE PRIOR ART

Patent Document

[Patent Document 1]
PCT International Publication No. WO2015/060277

Non Patent Documents

[Non Patent Document 1]
Kazutaka Hara, et al, "Flexible load distribution technique using dynamic wavelength bandwidth allocation (DWBA) toward 100 Gbit/s-class-WDM/TDM-PON", Tu. 3. B. 2, ECOC2010, 2010
[Non Patent Document 2]
S. Kimura, "WDM/TDM-PON Technologies for Future Flexible Optical Access Networks", 6A1-1, OECC2010, 2010
[Non Patent Document 3]
Tamaki, et al., "λ-Tunable WDM/TDM-PON System for Future Optical Access Network, The Institute of Electronics, Information and Communication Engineers Technical report", vol. 112, no. 118, pp 39-44, July 2012

SUMMARY OF INVENTION

Problem to be Solved by the Invention

In order to solve the above problems, an object of the present invention is to provide an optical communication system capable of simply switching back to a communication wavelength used before occurrence of an abnormality when communication between the OLT 10 and the ONU 20 is recovered from the abnormality after the abnormality occurs in the communication between the OLT 10 and the ONU 20.

Means for Solving the Problems

To achieve the above object, an optical communication system according to the present invention includes a plurality of subscriber devices and a single station-side device, and the station-side device includes a common monitoring control unit. When an abnormality occurs in communication between the station-side device and any one of the plurality of subscriber devices, the common monitoring control unit switches the communication wavelength used for the communication between the station-side device and the subscriber device in which the abnormality has occurred from the current communication wavelength to a auxiliary communication wavelength. Further, if the current communication wavelength is recovered from the abnormality, the common monitoring control unit switches the communication wavelength used for the communication between the station-side device and the subscriber device, which communicate using the recovered current communication wavelength, from the auxiliary communication wavelength back to the current communication wavelength.

Specifically, an optical communication system according to the present invention comprises a plurality of subscriber devices and a single station-side device connected to the subscriber devices by an optical line, and the station-side device comprises a common monitoring control unit that changes a communication wavelength allocated to the subscriber device that performs communication using a current communication wavelength in which an abnormality occurs from the current communication wavelength to a predetermined auxiliary communication wavelength when it is detected that the abnormality occurs in communication that uses the current communication wavelength allocated to any one of the plurality of subscriber devices, and changes the communication wavelength allocated to the subscriber device that performs communication using the auxiliary communication wavelength from the auxiliary communication wavelength to the current communication wavelength when the communication using the current communication wavelength in which the abnormality occurs is recovered.

Since the optical communication system according to the present invention includes the common monitoring control unit, the optical communication system can detect an abnormality in the communication using the current communication wavelength that occurs between the station-side device and any one of the plurality of subscriber devices, and change the communication wavelength from the current communication wavelength to the auxiliary communication wavelength. Further, when the communication is recovered from the abnormality, the common monitoring control unit can change the communication wavelength from the auxiliary communication wavelength to the current communication wavelength. Therefore, when the communication is recovered from the abnormality, the optical communication system of the present invention can easily perform switch-back to the communication wavelength used before the occurrence of the abnormality.

In the optical communication system according to the present invention, the station-side device may further include a station-side management table in which the current communication wavelength and the auxiliary communication wavelength are determined for each subscriber device in advance. The station-side management table may manage an operation state indicating whether a communication wavelength allocated to the subscriber device is the current communication wavelength or the auxiliary communication wavelength. The common monitoring control unit may change the operation state in the station-side management table from the current communication wavelength to the auxiliary communication wavelength and changes the communication wavelength allocated to the subscriber device to the auxiliary communication wavelength determined in the station-side management table when it is detected that the abnormality occurs in communication that uses the current communication wavelength allocated to any one of the plurality of subscriber devices, and may change the operation state in the station-side management table from the auxiliary communication wavelength to the current communication wavelength and may change the communication wavelength allocated to the subscriber device to the current communication wavelength determined in the station-side management table when communication using the current communication wavelength in which an abnormality occurs with respect to communication that uses the auxiliary communication wavelength allocated to any one of the plurality of subscriber devices is recovered.

In the optical communication system according to the present invention, the station-side device may further include a station-side timer that measures a predetermined constant time from a point in time at which it is detected that an abnormality occurs in the communication that uses the current communication wavelength, and the common monitoring control unit may set the auxiliary communication wavelength in the station-side management table as a new current communication wavelength when the common monitoring control unit detects that the station-side timer reaches the constant time with respect to communication that uses the auxiliary communication wavelength allocated to any one of the plurality of subscriber devices.

A station-side device according to the present invention is a station-side device included in an optical communication system in which a plurality of subscriber devices are connected to a single station-side device by an optical line, the station-side device including: a common monitoring control unit that changes a communication wavelength allocated to the subscriber device that performs communication using a current communication wavelength in which an abnormality occurs from the current communication wavelength to a predetermined auxiliary communication wavelength when it is detected that the abnormality occurs in communication that uses the current communication wavelength allocated to any one of the plurality of subscriber devices, and changes the communication wavelength allocated to the subscriber device that performs communication using the auxiliary communication wavelength from the auxiliary communication wavelength to the current communication wavelength at which the communication is recovered when the communication using the current communication wavelength in which the abnormality occurs is recovered.

A subscriber device according to the present invention is a subscriber device included in an optical communication system in which a plurality of subscriber devices are connected to a single station-side device by an optical line, the subscriber device including: a subscriber management table in which a current communication wavelength and a auxiliary communication wavelength used for communication with the station-side device are determined in advance, that manages an operation state indicating whether a wavelength allocated from the station-side device is the current communication wavelength or the auxiliary communication wavelength, and an individual monitoring control unit that changes the operation state in the subscriber management table from the current communication wavelength to the auxiliary communication wavelength and changes the communication wavelength with the station-side device to the auxiliary communication wavelength determined in the subscriber management table when it is detected that the abnormality occurs in communication that uses the current communication wavelength with the station-side device, and changes the operation state in the subscriber management table from the auxiliary communication wavelength to the current communication wavelength and changes communication wavelength with the station-side device to the current communication wavelength determined in the subscriber management table when a switch-back instruction is received from the station-side device.

The subscriber device according to the present invention may further include a subscriber timer that measures a predetermined constant time from a point in time at which it is detected that an abnormality occurs in the communication that uses the current communication wavelength, and the individual monitoring control unit may set the auxiliary communication wavelength in the subscriber management table as a new current communication wavelength when the individual monitoring control unit detects that the subscriber timer reaches the constant time with respect to communication that uses the auxiliary communication wavelength allocated to any one of the plurality of subscriber devices.

An optical communication method according to the present invention is an optical communication method of a station-side device and a subscriber device in an optical communication system in which a plurality of subscriber devices are connected to one station-side device by an optical line, the optical communication method including: an abnormality detection step of detecting that an abnormality occurs in communication between the station-side device and the subscriber device that uses a current communication wavelength allocated to any one of the plurality of station-side devices; a auxiliary wavelength switching step of changing the communication wavelength allocated to the subscriber device performing communication using the current communication wavelength in which the abnormality occurs, from the current communication wavelength to a predetermined auxiliary communication wavelength when the abnormality is detected in the abnormality detection step; and a wavelength switch-back step of changing the communication wavelength allocated to the subscriber device performing communication using the auxiliary communication wavelength from the auxiliary communication wavelength to the current communication wavelength when the communication is recovered from the abnormality detected by the abnormality detection step.

Each of the inventions described above may be combined as much as possible.

Advantageous Effects of Invention

According to the present invention, it is possible to provide an optical communication system capable of simply switching back to a communication wavelength used before occurrence of an abnormality when communication between the OLT 10 and the ONU 20 is recovered from the abnormality after the abnormality occurs in the communication between the OLT 10 and the ONU 20.

BRIEF DESCRIPTION OF DRAWINGS

FIG. 4 illustrates an example before an abnormality occurs in an OSU in a station-side management table held in an OLT according to Embodiment 1.

FIG. 5 illustrates an example before an abnormality occurs in an OSU in a subscriber management table held in an ONU according to Embodiment 1.

FIG. 6 illustrates an example after an abnormality occurs in the OSU in the station-side management table held in the OLT according to Embodiment 1.

FIG. 7 illustrates an example of the station-side management table after a switch-back protection time expires in the station-side management table held in the OLT according to Embodiment 1.

FIG. 8 illustrates an example of the subscriber management table after a switch-back protection time expires in the subscriber management table held in the ONU according to Embodiment 1.

FIG. 10 illustrates an example before an abnormality occurs in an OSU in a subscriber management table held in an ONU according to Embodiment 2.

FIG. 11 illustrates an example of the subscriber management table after a switch-back protection time expires in the subscriber management table held in the ONU according to Embodiment 2.

FIG. 12 illustrating an example after an abnormality occurs in an OSU in a station-side management table held in an OLT according to Embodiment 3.

FIG. 13 illustrates an example in which an OSU switches between ONUs with which the OSU communicates after an abnormality occurs in an OSU of an OLT in a station-side management table held in the OLT according to Embodiment 3.

EMBODIMENTS FOR CARRYING OUT THE INVENTION

Hereinafter, embodiments of the present invention will be described in detail with reference to the accompanying drawings. The present invention is not limited to the following embodiments. The embodiments are merely illustrative, and the present invention may be implemented in a form subjected to various modifications or improvements on the basis of knowledge of those skilled in the art. Components denoted with the same reference signs in this specification and drawings are assumed to indicate the same components.

Embodiment 1

Figure 3:
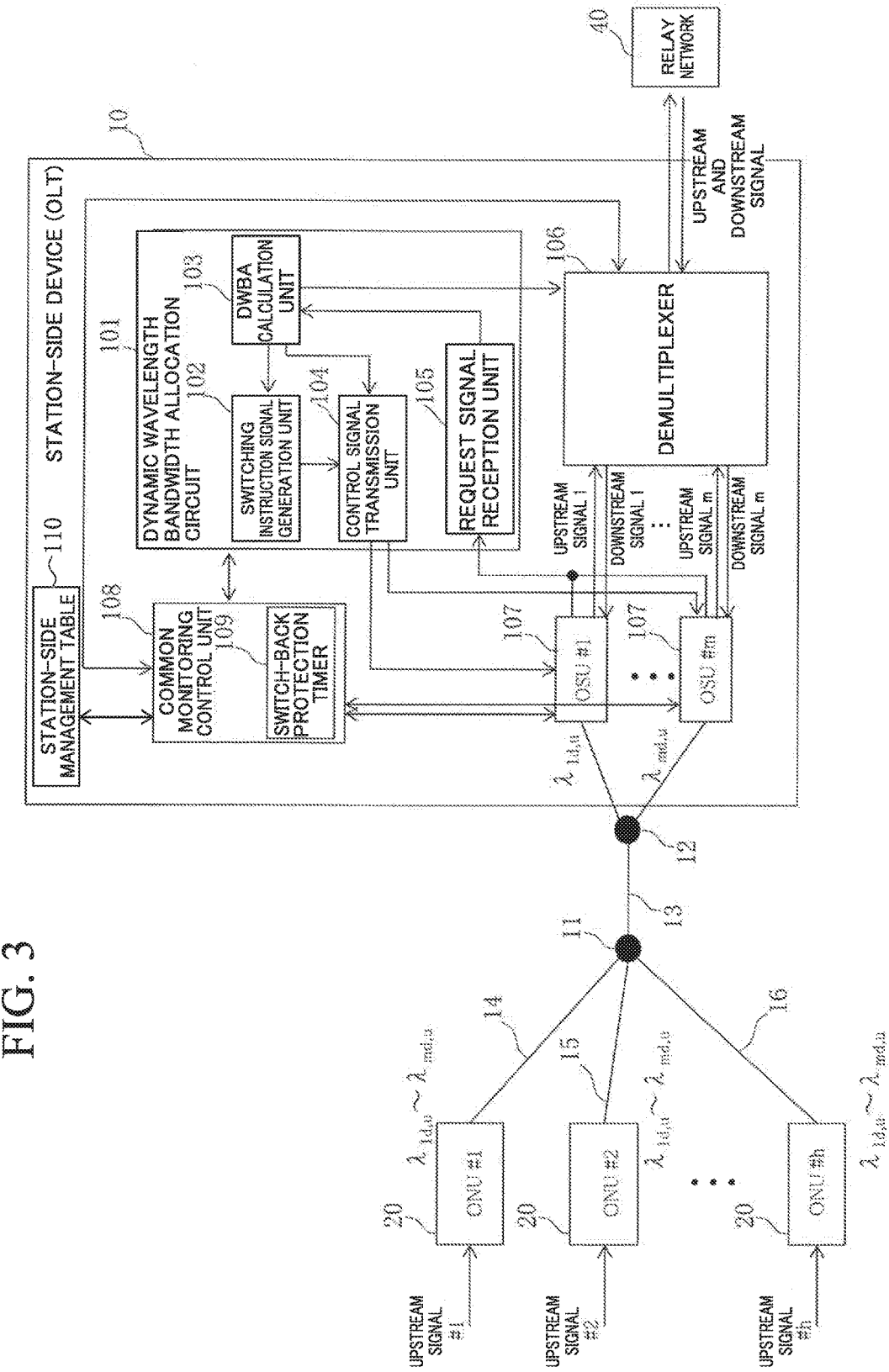
FIG. 3 is a block diagram illustrating an example of an optical communication system according to Embodiment 1 and Embodiment 2.

FIG. 3 illustrates an example of an optical communication system according to this embodiment. The optical communication system according to this embodiment includes a plurality of ONUs 20, and a single OLT 10. The ONU 20 functions as a subscriber device. The OLT 10 functions as a station-side device.

In the optical communication system according to this embodiment, the plurality of ONUs 20 are connected to the single OLT 10 using an optical fiber 13, an optical fiber 14, an optical fiber 15, an optical fiber 16, an optical multiplexer/demultiplexer 11, and an optical multiplexer/demultiplexer 12. The optical fiber 13, the optical fiber 14, the optical fiber 15, the optical fiber 16, the optical multiplexer/demultiplexer 11, and the optical multiplexer/demultiplexer 12 function as optical lines. For example, an optical line between the OLT 10 and the ONU 20 is connected in a PON topology of a point-to-multipoint configuration that uses the optical multiplexer/demultiplexer 11 and the optical multiplexer/demultiplexer 12.

Figure 1:
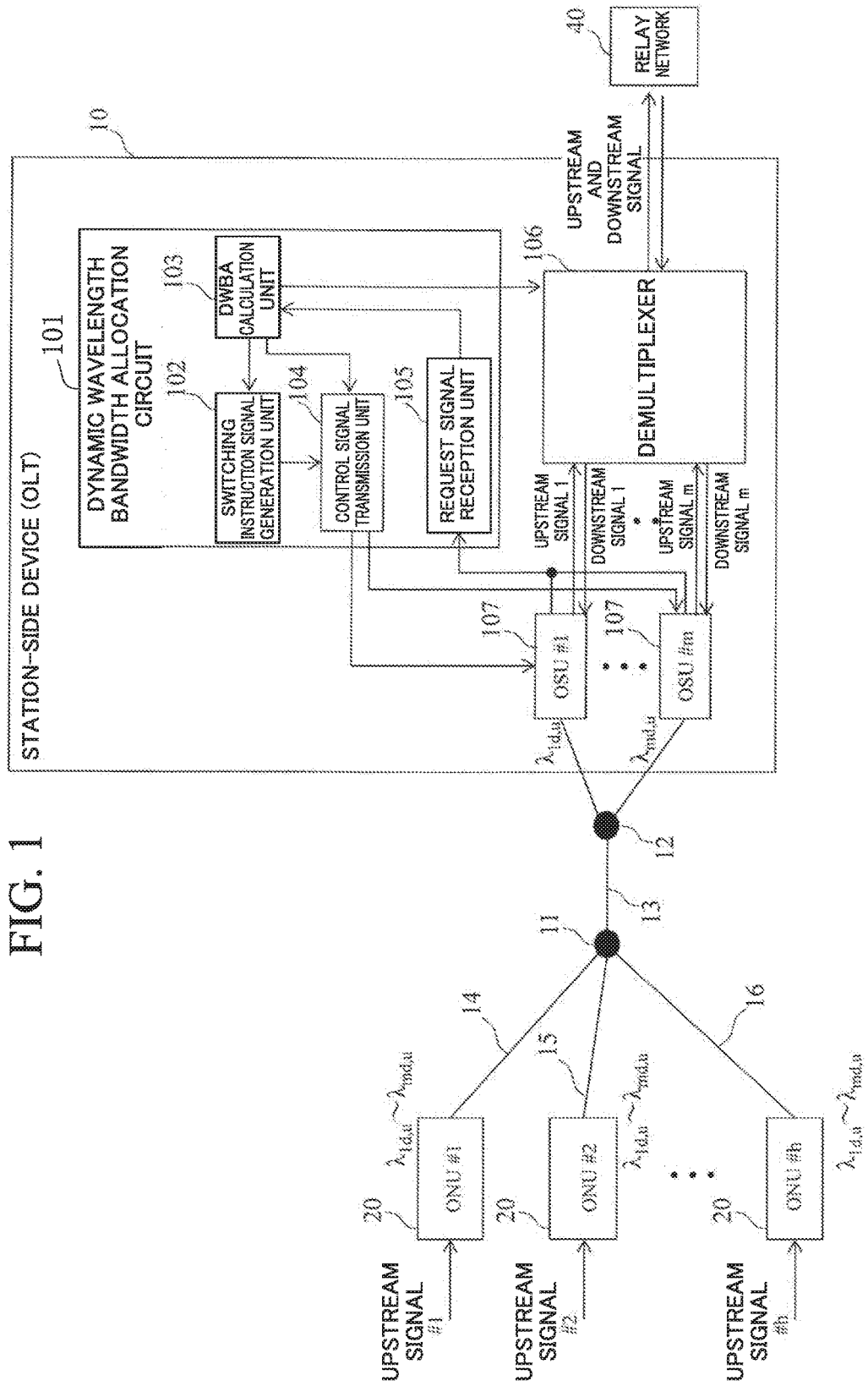
FIG. 1 is a block diagram illustrating an example of an optical communication system according to the present invention.

The OLT 10 includes a dynamic wavelength bandwidth allocation circuit 101, a demultiplexing unit 106, an OSU 107, and a common monitoring control unit 108. Since a configuration and an operation of the dynamic wavelength bandwidth allocation circuit 101, the demultiplexing unit 106, and the OSU 107 are the same as those in the OLT 10 illustrated in FIG. 1, descriptions thereof will be omitted.

Figure 2:
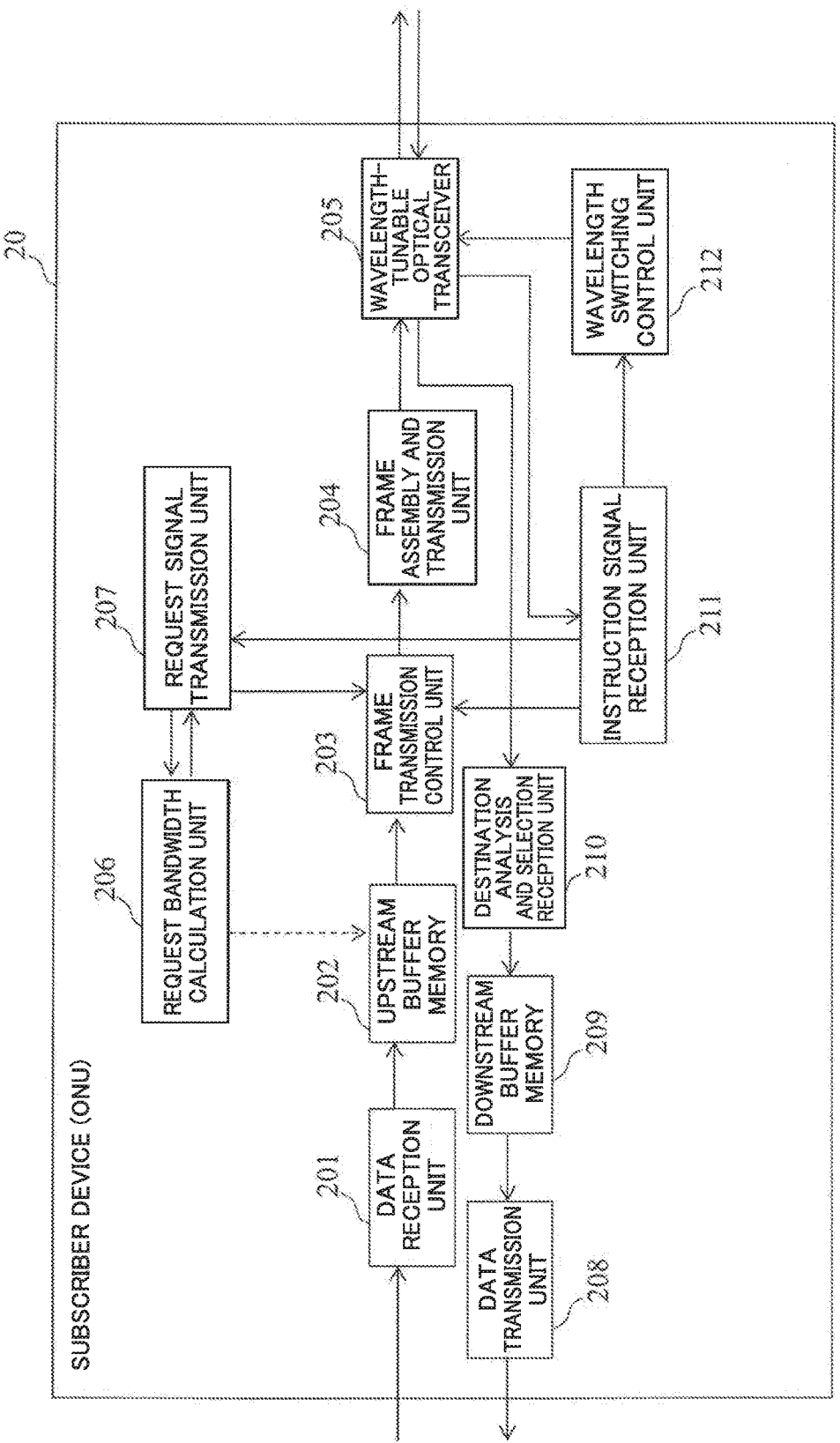
FIG. 2 is a block diagram illustrating an example of an ONU in an optical communication system according to the present invention.

As illustrated in FIG. 2, the ONU 20 includes a data reception unit 201, a data transmission unit 208, an upstream buffer memory 202, a downstream buffer memory 209, a destination analysis and selection reception unit 210, a frame transmission control unit 203, a frame assembly and transmission unit 204, a wavelength-tunable optical transceiver 205, a request bandwidth calculation unit 206, a request signal transmission unit 207, an instruction signal reception unit 211, and a wavelength switching control unit 212. An operation of the components is as described above.

The OLT 10 may be realized by causing a computer to function as the dynamic wavelength bandwidth allocation circuit 101, the demultiplexing unit 106, the OSU 107, and the common monitoring control unit 108. In this case, a central processing unit (CPU) included in the OLT 10 executes a computer program stored in a storage unit (not illustrated) so that each component is realized. Here, the computer in realizing the OLT 10 may further include any device that is controlled by the computer. Further, the program in realizing the OLT 10 may be recorded in a recording medium or may be provided through a network.

The OLT 10 includes a station-side management table (also referred to a wavelength switching destination table) 110. An example of the station-side management table (wavelength switching destination table) 110 is illustrated in FIG. 4. In the station-side management table (wavelength switching destination table), the current communication wavelength and the auxiliary communication wavelength are determined for each ONU 20 in advance, and an operation state indicating whether a communication wavelength allocated to the ONU 20 is the primary communication wavelength or the auxiliary communication wavelength is managed.

Each ONU 20 changes the OSU 107 to be connected by switching an upstream and downstream wavelength from a current communication wavelength to a auxiliary communication wavelength. The OLT 10 always recognizes which ONU 20 is connected to which OSU 107. Thus, the station-side management table (wavelength switching destination table) 110 of the OLT 10 illustrated in FIG. 4 may always be extracted and produced from management information of an OSU 107-ONU 20 correspondence relationship that is used by the OLT 10.

Similarly, the ONU 20 may also hold a set of current communication wavelengths and a set of auxiliary communication wavelengths in the ONU 20 as a subscriber management table. FIG. 5 illustrates an example of the subscriber management table according to this embodiment. The subscriber management table manages the current communication wavelength and the auxiliary communication wavelength of the ONU 20. Although not illustrated in FIG. 5, in the subscriber management table, an operation state indicating whether the communication wavelength allocated from the OLT 10 is the current communication wavelength or the auxiliary communication wavelength may be managed, as in the station-side management table illustrated in FIG. 4.

An optical communication method according to this embodiment will be described. The optical communication method according to this embodiment includes an abnormality detection procedure, a auxiliary wavelength switching procedure, and a wavelength switch-back procedure in order.

The ONU 20 communicates with the OSU 107 using the current communication wavelength that is a communication wavelength allocated to each ONU 20. In this case, the OLT 10 executes an abnormality detection procedure. In the abnormality detection procedure, the common monitoring control unit 108 detects that an abnormality has occurred in communication that uses the current communication wavelengths between the ONU 20 and the OSU 107 by monitoring whether there is an abnormality in each OSU 107 used for communication with the ONU 20.

When the common monitoring control unit 108 detects an abnormality, the common monitoring control unit 108 executes the auxiliary wavelength switching procedure. In the auxiliary wavelength switching procedure, the common monitoring control unit 108 changes the communication wavelength to be allocated to the ONU 20 that has communicated using the current communication wavelength in which the abnormality has occurred from the current communication wavelength to a predetermined auxiliary communication wavelength. For example, the common monitoring control unit 108 performs changing so that the ONU 20 belonging to the OSU 107 in which an abnormality has occurred belongs to the auxiliary OSU 107 that uses the auxiliary communication wavelength as a communication wavelength. When the OSU 107 to which the ONU 20 belongs is changed, the common monitoring control unit 108 performs change control so that a signal of the ONU 20 passes through the auxiliary OSU 107 in signal distribution of the ONU 20 in the demultiplexing unit 106 in cooperation with the dynamic wavelength bandwidth allocation circuit 101 and the demultiplexing unit 106.

The common monitoring control unit 108 executes the wavelength switch-back procedure if communication using any one of the current communication wavelengths in which the abnormality has occurred is recovered. In the wavelength switch-back procedure, the operation state of the ONU 20 in which the operation state of the station-side management table (wavelength switching destination table) 110 of the OLT 10 is the auxiliary communication wavelength is changed to the current communication wavelength, and the communication wavelength allocated to the ONU 20 that performs communication using the auxiliary communication wavelength is changed from the auxiliary communication wavelength to the current communication wavelength at which the communication is recovered.

The common monitoring control unit 108 includes a switch-back protection timer 109 functioning as a station-side timer for each OSU 107. The switch-back protection timer 109 measures a predetermined constant period of time from a point in time at which it is detected that an abnormality has occurred in the communication that uses the current communication wavelength. In this case, the common monitoring control unit 108 may give up waiting for recovery of the current wavelength at which the abnormality has occurred and treat the auxiliary communication wavelength as the current communication wavelength on the basis of the fact that a timer of the switch-back protection timer 109 has expired (has passed a switch-back protection time). In this case, the common monitoring control unit 108 sets the auxiliary communication wavelength in the ONU 20 in which the operation state of the station-side management table (wavelength switching destination table) 110 of the OLT 10 is the auxiliary communication wavelength, to a new current communication wavelength, and changes the operation state of the station-side management table (wavelength switching destination table) of the OLT 10 for the ONU 20 to the current communication wavelength. FIG. 7 illustrates an example of a station-side management table when a setting of the wavelength switching destination table of the OLT 10 is changed from the auxiliary communication wavelength to the current communication wavelength after a switch-back protection time of the switch-back protection timer 109 has elapsed.

The common monitoring control unit 108 may detect that the communication using the current communication wavelength at which the abnormality has occurred is recovered on the basis of a trigger applied from the outside. Here, the trigger from the outside is, for example, notifying the OLT 10 that the current wavelength is recovered from the abnormality and switch-back to the current wavelength is enabled by any trigger from an operator.

An application example of this embodiment will be described. Here, it is assumed that ONU#1 is connected to OSU#1 that uses $\lambda_{1u,d}$ and ONU#2 and ONU#h are connected to OSU#m that uses $\lambda_{mu,d}$ in an initial state, as illustrated in FIG. 3. In this embodiment, a set of an upstream wavelength $\lambda_{1u}$ and a downstream wavelength $\lambda_{1d}$ of OSU#1 is represented as $\lambda_{1u,d}$, and the upstream wavelength and the downstream wavelength are managed as a set. Further, the OLT 10 holds a set of current communication wavelengths and a set of auxiliary communication wavelengths. In this embodiment, it is not necessary for the upstream and downstream wavelengths to be managed as a set, and this embodiment can be realized even when an upstream and a downstream are separately managed. A case in which the OLT 10 holds the station-side management table (wavelength switching destination table) of FIG. 4 will be described in an application example of this embodiment.

First, an operation in the auxiliary wavelength switching procedure in which the respective ONUS 20 at the time of occurrence of an abnormality in the OSU 107 are distributively reconnected will be described. It is assumed that occurrence of an abnormality in OSU#m is detected during the execution of the abnormality detection procedure. In this case, ONU#2 performs wavelength switching to OSU#3 using $\lambda_{3u,d}$, ONU#h performs wavelength switching to OSU#1 using $\lambda 1_{u,d}$, and reconnection is performed so that the communication is recovered. In this embodiment, the ONU 20 performs wavelength switching to the auxiliary communication wavelength and reconnects to the auxiliary OSU 107. This wavelength switching means is in the scope of technology related to the present invention, and a specific method and a specific procedure do not matter. On the other hand, when the reconnection is completed, the OLT 10 changes the operation state of ONU#2 and ONU#h to the auxiliary communication wavelength in the station-side management table (wavelength switching destination table) of the OLT 10 illustrated in FIG. 4. The switching destination table after the change is illustrated in FIG. 6.

Next, a switch-back operation after the OSU 107 is recovered from the abnormality will be described. It is assumed that OSU#m is recovered through repair or exchange of OSU#m, and ONU#2 and ONU#h are switched back to OSU#m. First, in the technology related to the present invention, since the OLT 10 does not have the station-side management table (wavelength switching destination table) illustrated in FIG. 4, an operator finds ONU#2 and ONU#h connected to OSU#m using another means immediately before an abnormality occurs, and instructs the switching instruction signal generation unit 102 of the OLT 10 to perform a connection destination change based on wavelength switching of ONU#2 connected to OSU#3 to OSU#m. Then, a connection destination change based on wavelength switching of ONU#h connected to OSU#1 to OSU#m is performed. Thus, in the technology related to the present invention, work of designating the ONU 20 reconnected in the auxiliary communication wavelength and the distributed auxiliary OSU 107 one by one and performing switch-back to OSU#m that is the original OSU 107 one by one is necessary.

However, in the wavelength switch-back procedure of this embodiment, it can be seen that in the operation state shown in the station-side management table (wavelength switching destination table) of FIG. 6, the ONU 20 using the auxiliary communication wavelength and the ONU 20 in which the current communication wavelength is $\lambda_{mu,d}$ used by OSU#m are ONU#2 and ONU#h. Therefore, ONU#2 reconnected to OSU#3 and ONU#h reconnected to OSU#1 belonging to OSU#m recovered from the abnormality can be easily extracted by referring to the wavelength switching destination table after OSU#m is recovered from the abnormality. The common monitoring control unit 108 instructs the switching instruction signal generation unit 102 to perform a sequential switch-back operation on a set of extracted OSU 107 and ONU 20, and thus, all of the ONUs 20 can be switched back automatically or at a timing at which a switch-back instruction is applied from the operator to the OLT 10. Finally, the operation state of ONU#2 and ONU#h returns to the current communication wavelength.

Further, it may be considered that there is a need to change the OSU 107 reconnected through switching to the auxiliary communication wavelength to the current OSU 107, for example, since a considerable amount of time is taken for the recovery of OSU#m from the abnormality. In this case, first, the switch-back protection timer 109 for each OSU 107 included in the common monitoring control unit 108 of the OLT 10 illustrated in FIG. 3 is started after a switch-back protection time which is a certain time determined in the switch-back protection timer 109 for the OSU 107 in advance is set at a point in time at which an abnormality has occurred in the OSU 107 or at a point in time at which switching to the auxiliary communication wavelength has occurred.

If the common monitoring control unit 108 detects that the switch-back protection timer 109 has expired (the switch-back protection time has elapsed), the common monitoring control unit 108 interchanges the auxiliary communication wavelength and the current communication wavelength of the wavelength switching destination table of the OLT 10. For example, in this embodiment, in the description of ONU#2 and ONU#h in which the current communication wavelength in the wavelength switching destination table of the OLT 10 of FIG. 6 is $\lambda_{mu,d}$, the current communication wavelength and the auxiliary communication wavelength are interchanged and the operation state is changed to the current communication wavelength. Due to this change, the wavelength switching destination table in the OLT 10 in FIG. 6 is changed as illustrated in FIG. 7. Further, the common monitoring control unit of the OLT 10 may instruct ONU#2 and ONU#h to interchange registration of the current communication wavelength and the auxiliary communication wavelength of the wavelength switching destination table held in each ONU 20. In the case of this embodiment, the current OSU 107 of ONU#2 is changed to OSU#3 that uses $\lambda_{3u,d}$, the auxiliary OSU 107 is changed to OSU#m, the current OSU 107 of ONU#h is changed to OSU#1 that uses $\lambda_{1u,d}$, and the auxiliary OSU 107 is changed to OSU#m.

According to this embodiment, the following effects can be expected. In this embodiment, in distribution protection in which the ONU 20 is reconnected to a different OSU 107 through wavelength switching, the distributed ONU 20 and the initially connected OSU 107 can be easily specified. Therefore, when the OSU 107 in which an abnormality has occurred is recovered, an operation of returning the initially connected ONU 20 to an original state and connecting the ONU 20 can be performed. Further, in this embodiment, the switch-back protection timer 109 is included for each ONU 107, and the auxiliary communication wavelength in the wavelength switching destination table of the ONU 10 is changed to the current communication wavelength at a point in time at which the switch-back protection timer 109 has expired or at a point in time designated by an operator. Thus, a time limit at which a switch-back operation or a current communication wavelength that is a switch-back destination is valid can be determined. For example, if the current OSU 107 is not recovered over a long period of time, the auxiliary OSU 107 is caused to be currently used, and the auxiliary communication wavelength is reset again for another OSU 107 so that redundancy is rebuilt, such that switch-back for return to an original state is unnecessary at the time of subsequent recovery of the abnormal OSU 107. That is, a differentiation can be performed into a period of time in which return to an original state due to recovery from abnormality is prioritized (a period of time in which the switch-back protection timer is valid) and a period of time in which an operation state is prioritized without switch-back (a period of time after the switch-back protection timer has expired).

Embodiment 2

Figure 9:
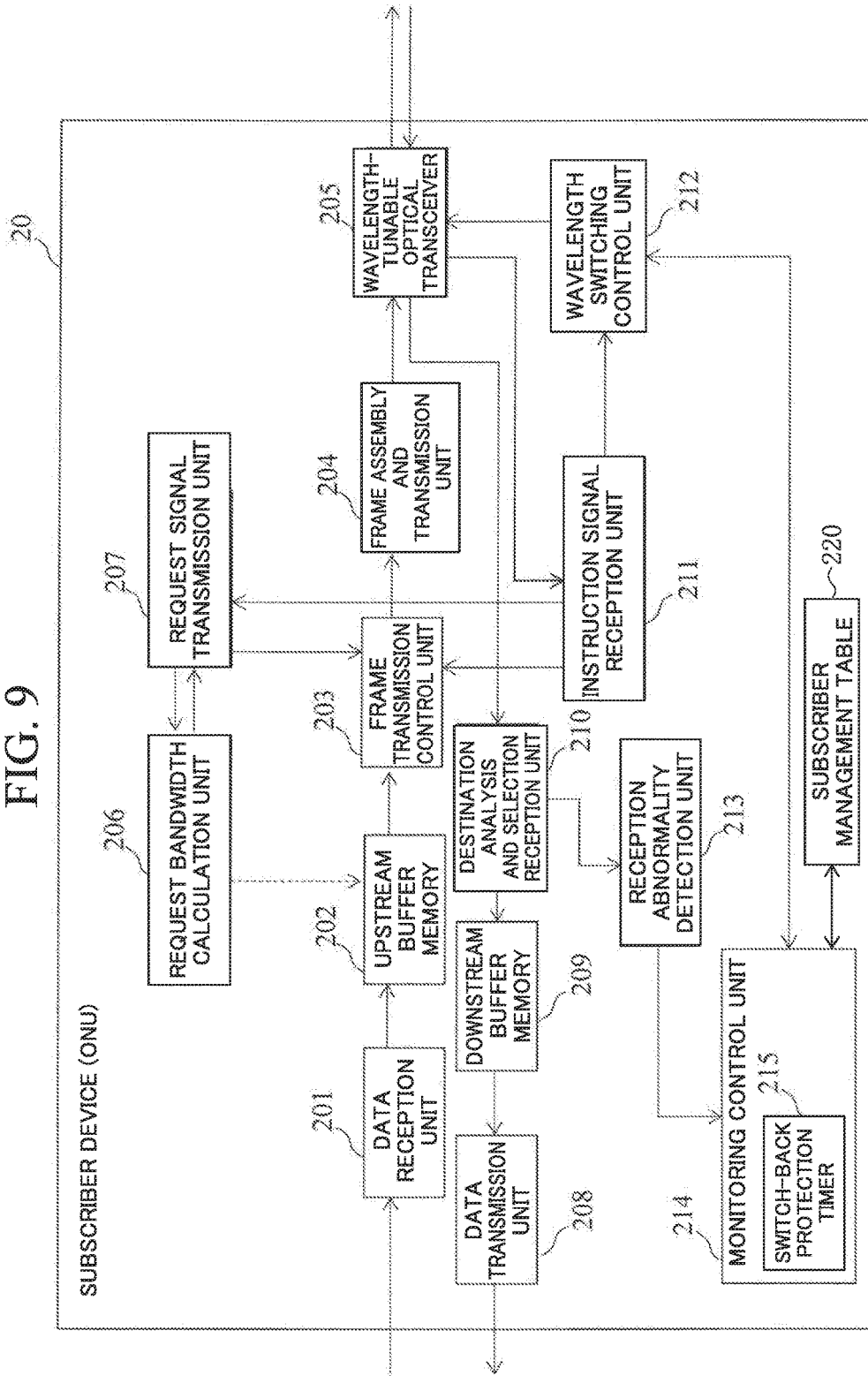
FIG. 9 illustrates a schematic diagram of an example of an ONU according to Embodiment 2.

In an optical communication system according to this embodiment, the ONU 20 detects an abnormality and switches a communication wavelength. FIG. 9 illustrates an example of an ONU 20 according to this embodiment. The ONU 20 according to this embodiment includes a data reception unit 201, a data transmission unit 208, an upstream buffer memory 202, a downstream buffer memory 209, a destination analysis and selection reception unit 210, a frame transmission control unit 203, a frame assembly and transmission unit 204, a wavelength-tunable optical transceiver 205, a request bandwidth calculation unit 206, a request signal transmission unit 207, an instruction signal reception unit 211, a wavelength switching control unit 212, a monitoring control unit 214, and a reception abnormality detection unit 213.

The ONU 20 may be realized by causing a computer to function as a data reception unit 201, a data transmission unit 208, an upstream buffer memory 202, a downstream buffer memory 209, a destination analysis and selection reception unit 210, a frame transmission control unit 203, a frame assembly and transmission unit 204, a wavelength-tunable optical transceiver 205, a request bandwidth calculation unit 206, a request signal transmission unit 207, an instruction signal reception unit 211, a wavelength switching control unit 212, a monitoring control unit 214, and a reception abnormality detection unit 213. In this case, a central processing unit (CPU) included in the ONU 20 executes a computer program stored in a storage unit (not illustrated) so that each component is realized. Here, the computer in realizing the ONU 20 may further include any device that is controlled by the computer. Further, the program in realizing the ONU 20 may be recorded in a recording medium or may be provided through a network.

The OLT 10 is connected to the ONU 20 in a PON topology of a point-to-multipoint configuration that uses the optical multiplexer/demultiplexer 11 and the optical multiplexer/demultiplexer 12. Further, the OLT 10 is connected to the relay network 40. The ONU 20 holds a subscriber management table (also referred to as a wavelength switching destination table) 220. FIG. 10 illustrates a subscriber management table 220 managed by each ONU 20 in this embodiment. Although not illustrated in FIG. 10, an operation state indicating whether the communication wavelength allocated from the OLT 10 is a current communication wavelength or a auxiliary communication wavelength may be managed in the subscriber management table, as in the station-side management table illustrated in FIG. 4.

An optical communication method according to this embodiment will be described. An optical communication method according to this embodiment includes an abnormality detection procedure, a auxiliary wavelength switching procedure, and a wavelength switch-back procedure in order.

The ONU 20 communicates with the OSU 107 using the current communication wavelength that is a communication wavelength allocated to each of the ONUs 20. In this case, the reception abnormality detection unit 213 executes an abnormality detection procedure. In the abnormality detection procedure, the reception abnormality detection unit 213 monitors the reception signal from the destination analysis and selection reception unit 210, and detects an abnormality of the reception signal of the ONU 20. Here, the reception abnormality detection unit 213 may monitor the reception signal from the wavelength-tunable optical transceiver 205 and detect an abnormality in the reception signal of the ONU 20.

The monitoring control unit 214 functions as an individual monitoring control unit, and receives a notification of the reception signal abnormality from the reception abnormality detection unit 213. The monitoring control unit 214 includes a switch-back protection timer 215. The switch-back protection timer 215 functions as a subscriber timer. The switch-back protection timer 215 measures a predetermined constant period of time from a point in time at which it is detected that an abnormality has occurred in the communication that uses the current communication wavelength.

When the monitoring control unit 214 detects an abnormality, the monitoring control unit 214 executes a auxiliary wavelength switching procedure. In the auxiliary wavelength switching procedure, the monitoring control unit 214 changes the operation state in the subscriber management table 220 from the current communication wavelength to the auxiliary communication wavelength. Further, the monitoring control unit 214 changes a wavelength for communication with the OLT 10 from the current communication wavelength to the auxiliary communication wavelength in the subscriber management table 220.

The monitoring control unit 214 receives a switch-back signal from the OLT 10, and performs the wavelength switch-back procedure if the current communication wavelength included in the switch-back signal matches the current communication wavelength of the subscriber management table 220. In the wavelength switch-back procedure, when the monitoring control unit 214 receives a switch-back instruction from the OLT 10, the monitoring control unit 214 changes the operation state in the subscriber management table 220 from the auxiliary communication wavelength to the current communication wavelength. Further, the monitoring control unit 214 changes a wavelength for communication with the station-side device from the auxiliary communication wavelength to the current communication wavelength in the subscriber management table 220. The monitoring control unit 214 may detect that the communication using the current communication wavelength in which an abnormality has occurred is recovered on the basis of a trigger from the outside and may perform the wavelength switch-back procedure. Here, the trigger from the outside is, for example, notifying the OLT 10 that the current wavelength is recovered from the abnormality and switch-back to the current wavelength is enabled by any trigger from an operator.

An application example of this embodiment will be described. Here, it is assumed that ONU#1 is connected to OSU#1 that uses $\lambda_{1u,d}$ and ONU#2 and ONU#h are connected to OSU#m that uses $\lambda_{mu,d}$ in an initial state, as illustrated in FIG. 3. In this embodiment, a set of an upstream wavelength $\lambda_{1u}$ and a downstream wavelength $\lambda_{1d}$ of OSU#1 is represented as $\lambda_{1u,d}$, and the upstream wavelength and the downstream wavelength are managed as a set. In this embodiment, it is not necessary for the upstream and downstream wavelengths to be managed as a set, and this embodiment can be realized even when an upstream and a downstream are separately managed.

First, an operation in the auxiliary wavelength switching procedure in which respective ONUS 20 at the time of occurrence of an abnormality in the OSU 107 are distributed and reconnected will be described. It is assumed that occurrence of an abnormality in OSU#m is detected during execution of the abnormality detection procedure. In this case, the reception abnormality detection unit 213 of ONU#2 and ONU#h connected to OSU#m detects an abnormality of a reception signal, and transmits a result of the detection to the monitoring control unit 214. The monitoring control unit 214 of ONU#2 instructs the wavelength switching control unit 212 to switch the communication wavelength from the current communication wavelength of the subscriber management table 220 to $\lambda_{3u,d}$ registered as a auxiliary communication wavelength in the subscriber management table 220, and then, reconnection to OSU#3 is performed to restore communication. The monitoring control unit 214 of ONU#h instructs the wavelength switching control unit 212 to switch the communication wavelength from the current communication wavelength of the subscriber management table 220 to $\lambda_{1u,d}$ registered as a auxiliary communication wavelength in the subscriber management table 220, and then, reconnection to OSU#1 is performed to restore communication. In this case, the operation state in the subscriber management table 220 is changed from the current communication wavelength to the auxiliary communication wavelength, and the wavelength for communication with the OLT 10 is changed from the current communication wavelength to the auxiliary communication wavelength in the subscriber management table 220. A means for causing the ONU 20 to perform wavelength switching to the auxiliary communication wavelength and reconnect to the auxiliary OSU 107 is in the scope of technology related to the present invention, and a specific method and a specific procedure do not matter in this embodiment.

Next, a switch-back operation after the OSU 107 is recovered from the abnormality in Embodiment 2 of the present invention will be described. It is assumed that OSU#m is recovered through repair or exchange of OSU#m, and ONU#2 and ONU#h are switched back to OSU#m. In the technology related to the present invention, since the OLT 20 does not have the subscribe management table illustrated in FIG. 8, an operator finds that ONU#2 and ONU#h are connected to OSU#m using another means immediately before an abnormality occurs, and instructs the switching instruction signal generation unit 102 of the OLT 10 to perform a connection destination change based on communication wavelength switching of ONU#2 connected to OSU#3 to OSU#m. Then, a connection destination change through communication wavelength switching of ONU#h connected to OSU#1 to OSU#m is performed. Thus, work of designating the ONU 20 reconnected in the auxiliary communication wavelength and the distributed and reconnected auxiliary OSU 107 one by one and performing switch-back to OSU#m that is the original OSU 107 one by one is necessary.

However, in the wavelength switch-back procedure of this embodiment, the common monitoring control unit 108 of the OLT 10 first notifies each ONU 20 of a switch-back signal including the current communication wavelength used by OSU#m that is the switch-back OSU 107 as a switch-back destination from all the ONUs 20 to all the OSUs 107. Then, when a communication wavelength that is a switch-back destination included in the switch-back signal received from the OLT 10 is a current communication wavelength described in the subscriber management table 220 held in the ONU 20 and a wavelength at which the switch-back signal is transmitted and received is equal to the auxiliary communication wavelength described in the subscriber management table 220, each ONU 20 changes the operation state in the subscriber management table 220 from the auxiliary communication wavelength to the current communication wavelength, and starts a switch-back operation from the auxiliary communication wavelength of the communication wavelength to the current communication wavelength.

It can be confirmed whether a wavelength at which the switch-back signal is transmitted and received is the auxiliary communication wavelength, by comparing information on the current communication wavelength that the monitoring control unit 214 uses from the wavelength switching control unit 212 or the wavelength-tunable optical transceiver 205, with the subscriber management table (wavelength switching destination table) 220 held in the ONU 20. In the subscriber management table of FIG. 10, since the OSU 107 with which ONU#2 and ONU#h communicate at the current communication wavelength is OSU#m, ONU#2 and ONU#h execute an operation of switch-back to OSU#m. Therefore, after OSU#m is recovered from the abnormality, all ONUs 20 are notified of the switch-back signal, and accordingly, ONU#2 reconnected to OSU#3 belonging to OSU#m recovered from the abnormality and ONU#h reconnected to OSU#1 are automatically switched back to OSU#m. In the switch-back operation of the ONU 20, wavelength switching control may start from the OSU#3 and OSU#1 in response to, for example, a switch-back signal from ONU#2 and ONU#h, or ONU#2 and ONU#h may be voluntarily initialized and initial connection operation may be performed using OSU#m as a connection destination.

Further, it may be considered that there is a need to change the OSU 107 reconnected through switching to the auxiliary communication wavelength to the current OSU 107, for example, since a considerable amount of time is taken for the recovery of OSU#m from the abnormality. In this case, first, the switch-back protection timer 215 included in the monitoring control unit 214 of the ONU 20 illustrated in FIG. 9 is started after a switch-back protection time of the timer is set at a point in time at which an abnormality has occurred in communication between the ONU 20 and the OSU 107 or at a point in time at which switching to the auxiliary communication wavelength of the ONU 20 has occurred. Then, when the timer has expired (has passed the switch-back protection time) or when the ONU 20 receives a signal for performing a timer completion process in the OLT 10, which the operator instructs the OLT 10, the auxiliary communication wavelength and the current communication wavelength of the subscriber management table (wavelength switching destination table) 220 of the ONU 20 performing communication using the auxiliary communication wavelength are interchanged, and the operation state of the subscriber management table (wavelength switching destination table) is changed from the auxiliary communication wavelength to the current communication wavelength change. For example, in this embodiment, in the wavelength switching destination table of the ONU 20, the ONU#2 in which the current communication wavelength is $\lambda_{mu,d}$ interchanges the current communication wavelength $\lambda_{mu,d}$ and the auxiliary communication wavelength $\lambda_{3u,d}$, and ONU#h interchanges the current communication wavelength $\lambda_{mu,d}$ and the auxiliary communication wavelength $\lambda_{1u,d}$, as illustrated in FIG. 11. Here, ONU#2 and ONU#h may notify the common monitoring control unit 108 of the OLT 10 that the current communication wavelength and the auxiliary communication wavelength in the wavelength switching destination table of the ONU 20 are interchanged through a control channel that is a dedicated wavelength for sending a control signal.

In this embodiment, the following effects can be expected. In this embodiment, in distribution protection in which the ONU 20 is reconnected to a different OSU 107 through wavelength switching, it is not necessary for the OSU 107 to manage a distributed ONU 20 and an initially connected OLT 10. Further, when the OSU 107 in which an abnormality has occurred is recovered, an operation of returning the initially connected ONU 20 to an original state and connecting the ONU 20 can be performed. Accordingly, the ONU 20s distributed and reconnected at the auxiliary communication wavelength are simultaneously automatically switched back to the initially connected OSU 107.

Further, in this embodiment, the switch-back protection timer 215 is included for each ONU 20, and the auxiliary communication wavelength in the wavelength switching destination table of the ONU 20 is changed to the current communication wavelength at a point in time at which the switch-back protection timer 215 has expired or at a point in time designated by an operator. Thus, a time limit at which a switch-back operation or a current communication wavelength that is a switch-back destination is valid can be determined. For example, if the current OSU 107 is not recovered over a long period of time, the auxiliary OSU 107 is caused to be currently used, and the auxiliary communication wavelength is reset again for another OSU 107 so that redundancy is rebuilt, such that switch-back for return to an original state is unnecessary at the time of subsequent recovery of the abnormal OSU 107. That is, a division can be performed into a period of time in which return to an original state due to recovery from abnormality is prioritized (a period of time in which the switch-back protection timer is valid) and a period of time in which an operation state is prioritized without switch-back (a period of time after the switch-back protection timer has expired).

Thus, in the switch-back method according to this embodiment, a method in which the operating OSU 107 performs preventive maintenance measures for abnormalities or the OSU 107 and then easily and automatically performs return to an original state of communication service in the variable wavelength WDM/TDM-PON can be provided.

Embodiment 3

In this embodiment, when an abnormality at a current communication wavelength has occurred in an optical communication system, the common monitoring control unit 108 switches a communication wavelength from the current communication wavelength to the auxiliary communication wavelength, and then, changes the auxiliary communication wavelength to a auxiliary communication wavelength corresponding to another OSU 107.

An optical communication method according to this embodiment will be described. An optical communication method according to this embodiment includes an abnormality detection procedure, a auxiliary wavelength switching procedure, and a wavelength switch-back procedure in order. The common monitoring control unit 108 executes the abnormality detection procedure to detect occurrence of an abnormality in communication that uses a current communication wavelength between the OLT 10 and the ONU 20.

If an abnormality is detected in the abnormality detection procedure, the common monitoring control unit 108 executes the auxiliary wavelength switching procedure. In the auxiliary wavelength switching procedure, the common monitoring control unit 108 changes a communication wavelength to be allocated to the ONU 20 that communicates using the current communication wavelength in which the abnormality has occurred from the current communication wavelength to a predetermined auxiliary communication wavelength. FIG. 12 illustrates an example of a station-side management table in a case in which a communication wavelength is changed from a current communication wavelength to a auxiliary communication wavelength when an abnormality has occurred in communication that uses the current communication wavelength in an optical communication system according to this embodiment. The station-side management table according to this embodiment has two types of auxiliary communication wavelengths including auxiliary communication wavelength 1 and auxiliary communication wavelength 2, and if an abnormality is detected in the abnormality detection procedure, the communication wavelength is changed from a current communication wavelength to auxiliary communication wavelength 1. The auxiliary communication wavelengths illustrated in FIG. 12 include two types including auxiliary communication wavelength 1 and auxiliary communication wavelength 2, but the number of types of auxiliary communication wavelengths included in the optical communication system according to this embodiment is arbitrary.

In the station-side management table of FIG. 12, an abnormality occurs in OSU#m with which ONU#2 and ONU#h communicate, and a communication wavelength used by ONU#2 and ONU#h is changed from the current communication wavelength to auxiliary communication wavelength 1. After the communication wavelength of ONU#2 and ONU#h is changed to auxiliary communication wavelength 1, ONU#1 communicates with OSU#1, ONU#2 communicates with OSU#3, and ONU#h communicates with OSU#1.

When an abnormality has occurred in OSU#3 with which ONU#2 communicates or a trigger from the outside is applied after the communication wavelength is changed as illustrated in FIG. 12 in the auxiliary wavelength switching procedure, the OSU 107 with which ONU#2 communicates is switched. The trigger from the outside is, for example, an instruction for the OLT 10 to change the communication wavelength between the OLT 10 and the ONU 20. FIG. 13 illustrates an example of the station-side management table in a case in which the OSU 107 with which ONU#2 communicates is switched from the OSU#3 to OSU#1 after the communication wavelength is switched as illustrated in FIG. 12 in the auxiliary wavelength switching procedure. In this embodiment, if the OSU 107 with which the ONU 20 communicates is switched, the communication wavelength is changed from auxiliary communication wavelength 1 to auxiliary communication wavelength 2 among the auxiliary communication wavelengths. In FIG. 13, the OSU 107 with which ONU#2 communicates is switched from the OSU#3 to OSU#1, but if there is an ONU 20 that communicates with another OSU#3, the communication destination OSU 107 is switched to OSU#1 at the same time as the switching of the communication destination OSU 107 of ONU#2.

If the communication using any one of the current communication wavelengths in which the abnormality has occurred is recovered, the common monitoring control unit 108 executes the wavelength switch-back procedure. In the wavelength switch-back procedure, the operation state in the station-side management table is changed from auxiliary communication wavelength 1 or auxiliary communication wavelength 2 to the current communication wavelength, and the communication wavelength between the OLT 10 and the ONU 20 is changed from auxiliary communication wavelength 1 or auxiliary communication wavelength 2 to the current communication wavelength. In FIG. 13, if OSU#m is recovered from the abnormality and communication between OSU#m and the ONU 20 can be performed, the operation state of ONU#2 and ONU#3 is changed from auxiliary communication wavelength 1 or auxiliary communication wavelength 2 to the current communication wavelength.

Although the example in which the common monitoring control unit 108 changes the communication wavelength from auxiliary communication wavelength 1 to auxiliary communication wavelength 2 has been illustrated in this embodiment, the reception abnormality detection unit 213 may change the communication wavelength from auxiliary communication wavelength 1 to auxiliary communication wavelength 2.

By using the optical communication system according to this embodiment, it is possible to continuously recognize the current communication wavelength even when wavelength switching due to another factor occurs during an operation at the auxiliary communication wavelength. Therefore, an operation of switching back to the current communication wavelength shown in the Embodiments 1 and 2 can be performed after the current communication wavelength is recovered from the abnormality.

INDUSTRIAL APPLICABILITY

The optical communication system, the station-side device, the subscriber device, and the optical communication method of the present invention are applicable to the telecommunication industry.

REFERENCE SYMBOLS

10: station-side device (OLT)
11: optical multiplexer/demultiplexer
12: optical multiplexer/demultiplexer
13, 14, 15, 16: optical fiber
101: dynamic wavelength bandwidth allocation circuit
102: switching instruction signal generation unit
103: DWBA calculation unit
104: control signal transmission unit
105: request signal reception unit
106: demultiplexing unit
107: OSU
108: common monitoring control unit
109: switch-back protection timer
20: subscriber device (ONU)
201: data reception unit
202: upstream buffer memory
203: frame transmission control unit
204: frame assembly and transmission unit
205: wavelength-tunable optical transceiver
206: request bandwidth calculation unit
207: request signal transmission unit
208: data transmission unit
209: downstream buffer memory
210: destination analysis and selection reception unit
211: instruction signal reception unit
212: wavelength switching control unit
213: reception abnormality detection unit
214: monitoring control unit
215: switch-back protection timer
40: relay network

The invention claimed is:

1. An optical communication system comprising a plurality of subscriber devices and a single station-side device connected to the subscriber devices by an optical line, the station-side device comprising:
a common monitoring control unit that changes a communication wavelength allocated to the subscriber device that performs communication using a current communication wavelength in which an abnormality occurs from the current communication wavelength to a predetermined auxiliary communication wavelength when it is detected that the abnormality occurs in communication that uses the current communication wavelength allocated to any one of the plurality of subscriber devices, and changes the communication wavelength allocated to the subscriber device that performs communication using the auxiliary communication wavelength from the auxiliary communication wavelength to the current communication wavelength when the communication using the current communication wavelength in which the abnormality occurs is recovered; and
a station-side timer that measures a predetermined constant time from a point in time at which it is detected that an abnormality occurs in the communication that uses the current communication wavelength, wherein
the common monitoring control unit sets the auxiliary communication wavelength of the subscriber device as a new current communication wavelength when the common monitoring control unit detects that the station-side timer reaches the predetermined constant time with respect to communication that uses the auxiliary communication wavelength allocated to any one of the plurality of subscriber devices.

2. The optical communication system according to claim 1, wherein:
the station-side device further comprises a station-side management table in which the current communication wavelength and the auxiliary communication wavelength are determined for each subscriber device in advance, the station-side management table managing an operation state indicating whether the communication wavelength allocated to the subscriber device is the current communication wavelength or the auxiliary communication wavelength; and
the common monitoring control unit
changes the operation state in the station-side management table from the current communication wavelength to the auxiliary communication wavelength and changes the communication wavelength allocated to the subscriber device to the auxiliary communication wavelength determined in the station-side management table when it is detected that the abnormality occurs in communication that uses the current communication wavelength allocated to any one of the plurality of subscriber devices, and
changes the operation state in the station-side management table from the auxiliary communication wavelength to the current communication wavelength and changes the communication wavelength allocated to the subscriber device to the current communication wavelength determined in the station-side management table when communication using the current communication wavelength in which an abnormality occurs with respect to communication that uses the auxiliary communication wavelength allocated to any one of the plurality of subscriber devices is recovered.

3. A station-side device included in an optical communication system in which a plurality of subscriber devices are connected to a single station-side device by an optical line, the station-side device comprising:
a common monitoring control unit that
changes a communication wavelength allocated to the subscriber device that performs communication using a current communication wavelength in which an abnormality occurs from the current communication wavelength to a predetermined auxiliary communication wavelength when it is detected that the abnormality occurs in communication that uses the current communication wavelength allocated to any one of the plurality of subscriber devices, and
changes the communication wavelength allocated to the subscriber device that performs communication using the auxiliary communication wavelength from the auxiliary communication wavelength to the current communication wavelength at which the communication is recovered when the communication using the current communication wavelength in which the abnormality occurs is recovered; and
a station-side timer that measures a predetermined constant time from a point in time at which it is detected that an abnormality occurs in the communication that uses the current communication wavelength, wherein
the common monitoring control unit sets the auxiliary communication wavelength of the subscriber device as a new current communication wavelength when the common monitoring control unit detects that the station-side timer reaches the predetermined constant time with respect to communication that uses the auxiliary communication wavelength allocated to any one of the plurality of subscriber devices.

4. A subscriber device included in an optical communication system in which a plurality of subscriber devices are connected to a single station-side device by an optical line, the subscriber device comprising:
  a subscriber management table in which a current communication wavelength and a auxiliary communication wavelength used for communication with the station-side device are determined in advance, that manages an operation state indicating whether a wavelength allocated from the station-side device is the current communication wavelength or the auxiliary communication wavelength;
  an individual monitoring control unit that changes the operation state in the subscriber management table from the current communication wavelength to the auxiliary communication wavelength and changes the communication wavelength with the station-side device to the auxiliary communication wavelength determined in the subscriber management table when it is detected that the abnormality occurs in communication that uses the current communication wavelength with the station-side device, and changes the operation state in the subscriber management table from the auxiliary communication wavelength to the current communication wavelength and changes communication wavelength with the station-side device to the current communication wavelength determined in the subscriber management table when a switch-back instruction is received from the station-side device; and
  the subscriber device further comprises a subscriber timer that measures a predetermined constant time from a point in time at which it is detected that an abnormality occurs in the communication that uses the current communication wavelength, wherein
  the individual monitoring control unit sets the auxiliary communication wavelength in the subscriber management table as a new current communication wavelength when the individual monitoring control unit detects that the subscriber timer reaches the constant time with respect to communication that uses the auxiliary communication wavelength allocated to any one of the plurality of subscriber devices.

5. An optical communication method of a station-side device and a subscriber device in an optical communication system in which a plurality of subscriber devices are connected to one station-side device by an optical line, the optical communication method comprising:
  an abnormality detection step of detecting that an abnormality occurs in communication between the station-side device and the subscriber device that uses a current communication wavelength allocated to any one of the plurality of station-side devices;
  a auxiliary wavelength switching step of changing the communication wavelength allocated to the subscriber device performing communication using the current communication wavelength in which the abnormality occurs, from the current communication wavelength to a predetermined auxiliary communication wavelength when the abnormality is detected in the abnormality detection step; and
  a wavelength switch-back step of changing the communication wavelength allocated to the subscriber device performing communication using the auxiliary communication wavelength from the auxiliary communication wavelength to the current communication wavelength when the communication is recovered from the abnormality detected by the abnormality detection step, and the optical communication method further comprising
  measuring by a station-side timer a predetermined constant time from a point in time at which it is detected that an abnormality occurs in the communication that uses the current communication wavelength; and
  setting the auxiliary communication wavelength of the subscriber device as a new current communication wavelength when the station-side timer reaches the predetermined constant time with respect to communication that uses the auxiliary communication wavelength allocated to any one of the plurality of subscriber devices.

* * * * *